United States Patent [19]
Newton

[11] Patent Number: 5,217,068
[45] Date of Patent: Jun. 8, 1993

[54] STUFFING BOX

[76] Inventor: Hille Newton, P.O. Box 6204, Bonnyville, Alberta, Canada, T9N 2G8

[21] Appl. No.: 782,544

[22] Filed: Oct. 25, 1991

[30] Foreign Application Priority Data

Oct. 25, 1990 [CA] Canada ................................ 2028555

[51] Int. Cl.⁵ .......................... E21B 33/03; F16J 15/56
[52] U.S. Cl. ....................................... 166/84; 277/30; 277/31
[58] Field of Search ............................ 166/82, 84, 170; 277/24, 31, 50, 51, 64, 30

[56] References Cited

U.S. PATENT DOCUMENTS 2,199,735  5/1940  Beckman ................................ 277/31
2,864,631  12/1958  Kemp .................................. 277/64 X
4,640,305  2/1987  Johnson ............................... 277/24 X Primary Examiner—David J. Bagnell
Attorney, Agent, or Firm—John E. Reilly

[57] ABSTRACT

An improvement in a stuffing box for a rotary polished rod having a tubular housing with first and second rod guides disposed at each end and packing elements therebetween. The lower rod guide is in the form of an annular bushing, and annular interior sealing elements are disposed at each of the ends of the bushing thereby effecting a sealing engagement between the internal surface of the bushing and the external surface of the rod. An annular exterior sealing element is disposed on the external surface of the bushing thereby effecting a sealing engagement between the external surface of the bushing and the internal surface of the housing, and bearing members are interposed between the rod guides and packing elements, each having an inner race rotatable with the polished rod and an outer stationary race.

15 Claims, 1 Drawing Sheet

STUFFING BOX

The present invention relates to an improvement in a stuffing box used for a rotary polished rod.

BACKGROUND AND FIELD OF THE INVENTION

In rotating well pumping apparatus, it is customary to employ a stuffing box at the wellhead to prevent oil, water, and gases produced under pressure by the rotating pumping apparatus from escaping into the atmosphere.

Generally, the stuffing box surrounds a portion of the polished rod in order to guide or center the polished rod for rotary movement without the escape of produced liquids or gases. Typically, the stuffing box is able to prevent the loss of produced liquids or gases by utilization of a series of annular packing elements which are compressed until they engage the external surface of the polished rod. The stuffing box is connected directly into the well production string, by threading the lower end of the stuffing box assembly into a conventional flow tee or pipe fitting.

A problem experienced with stuffing boxes for rotary applications is excessive packing wear which results in leakage. For example, in rotary drive downhole progressive cavity pumps, the pump barrel and pump screw are installed in the well. The pump barrel is attached to the bottom of the production piping or tubing and can be installed as deep as 1500 feet or more. The screw or rotor which rotates inside the stationary barrel squeezes the fluid up through the pump and tubing and is attached to a shaft which extends from the screw to the rotary drive assembly at the surface. Typically, surface-mounted rotary drive assemblies have used conventional style wellhead stuffing boxes. The stuffing box has included a brass bushing placed in the upper and lower stuffing box cavity with packing rings installed between the two bushings. Using conventional brass bushings and packing can cause severe wear on the drive rod, stationary brass bushing and the packing. This in turn causes packing wear and polished rod wear resulting in excess leaked production lost to the environment.

SUMMARY OF THE INVENTION

Accordingly, it is an object of the present invention to provide for a novel and improved stuffing box for rotary drive assemblies and particularly for use with rotary polished rods which is highly dependable and efficient in operation.

It is another object of the present invention to provide for a novel and improved stuffing box assembly which is so constructed and arranged as to minimize excessive packing wear as well as polished rod wear and thereby avoid excessive leaked production in rotary drive applications.

A further object and feature of the present invention is to provide in a stuffing box assembly for novel and improved bearing members and rotating shaft oil seals in the bottom and top bushings of the stuffing box assembly and in further combination with lubrication grooves.

In accordance with the present invention, there is provided an improvement in a stuffing box used for a rotary polished rod. These stuffing boxes generally have a generally tubular housing, a first rod guide and a second rod guide at opposite ends of the housing, and annular packing elements are disposed between the first rod guide and the second rod guide; further, means are disposed in the housing for exerting a compressive force on the annular packing elements thereby bringing the annular packing elements into engagement with an external surface of a rod extending through the housing. The improvement is comprised of a second rod guide in the form of an annular bushing, annular interior sealing elements at the ends of the bushing thereby effecting a sealing engagement between the internal surface of the bushing and the external surface of the rod; and an annular exterior sealing element is disposed in sealing engagement between the external surface of the bushing and the internal surface of the housing.

It has been determined that the saturation of the annular packing elements with produced fluids contributes to premature wear. The use of a second rod guide, as described, reduces packing wear by retarding the leakage of gas and oil between the polished rod and the housing. The effectiveness of the seal obtained by the second rod guide is improved when the external surface of the bushing has a first portion of one diameter adjacent the first end, a second portion of a reduced diameter adjacent the second end, and a shoulder extending between the first portion and the second portion. The external sealing element is positioned on the shoulder such that the shoulder engages the stop means in sealing engagement.

Although beneficial results may be obtained through the use of the improvement as described, a certain amount of friction occurs between the second rod guide and the annular packing elements. Accordingly, at least one bearing is disposed in the passage between the annular packing elements and the second rod guide, and an additional bearing may be disposed in the passage between the annular packing elements and the first rod guide. The presence of a lubricant between the second rod guide and the polished rod both reduces wear between the polished rod and the second rod guide and precludes the passage of gas and oil. To this end, at least one lubrication port extends from the lubrication groove through the bushing from the external surface to the internal surface and the internal surface of the bushing has a spiral lubrication groove communicating with the lubrication port.

The above and other objects, advantages and features of the present invention will become more readily appreciated and understood from a consideration of the following detailed description when taken together with the accompanying drawings in which:

DETAILED DESCRIPTION OF THE PREFERRED EMBODIMENT

Figure 1:
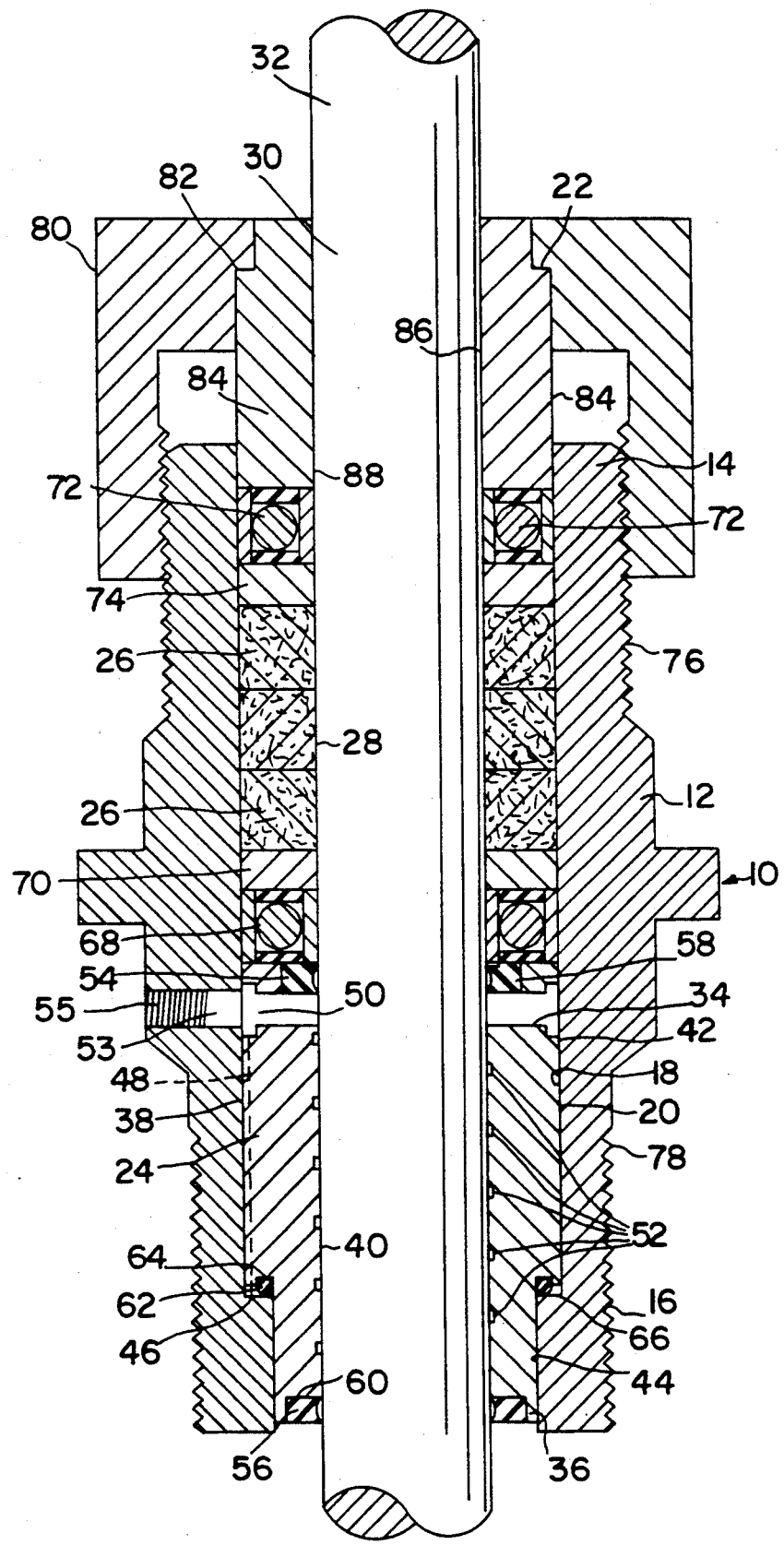
FIG. 1 is a view partially in section of a preferred form of stuffing box assembly in accordance with the present invention.

Referring in more detail to the drawings, there is illustrated in FIG. 1 a preferred form of stuffing box for a rotary polished rod, which stuffing box is generally referred to by reference numeral 10. Stuffing box 10 is an improvement over stuffing boxes known in the art. In the description which follows the applicant will endeavor to distinguish between those elements of stuffing box 10 which are common in the art and those elements which constitute improvements.

Firstly, there will be described those elements of stuffing box 10 which are known in the art. Stuffing box 10 consists of a generally tubular housing 12 having a first end 14, a second end 16, and internal surface 18. Internal surface 18 defines a passage 20 which extends between first end 14 and second end 16. A first rod guide 22 is disposed in passage 20 at first end 14 of housing 12. A second rod guide 24 is disposed in passage 20 at second end 16 of housing 12. Annular packing elements 26 having a central bore 28 are disposed in passage 20 of housing 12 between first rod guide 12 and second rod guide 24. Stop means which will be hereinafter further described are disposed on internal surface 18 at second end 16 of housing 12 to prevent withdrawal of second rod guide 22 from second end 16 of housing 12. Means which will be hereinafter described are disposed at first end 14 of housing 12 for exerting a compressive force on annular packing elements 26, to bring annular packing elements 26 into engagement with an external surface 30 of a polished rod 32 extending through central bore 28 of annular packing elements 26. The above described elements are common to stuffing boxes presently used in the art. The elements which constitute the improvement will now be described.

Second rod guide 24 is in the form of an annular bushing having a first end 34, a second end 36, an external surface 38 and an internal surface 40. Internal surface 40 defines a bore extending between first end 34 and second end 36. External surface 38 of second rod guide 24 has a first portion 42 of one diameter adjacent first end 34 and a second portion 44 of a reduced diameter adjacent second end 36. A shoulder 46 extends between first portion 42 and second portion 44. External surface 38 of second rod guide 24 has a lubrication groove 48. A lubrication port 50 extends from lubrication groove 48 through second rod guide 24 from external surface 38 to internal surface 40. Internal surface 40 has a spiral lubrication groove 52 communicating with lubrication port 50. A lubrication channel 53 extends through housing 12 communicating with lubrication groove 48. A plug 55 is used as a closure on lubrication channel 53.

Annular interior sealing elements 54 and 56 are disposed in seal grooves 58 and 60, respectively. Seal grooves 58 and 60 are positioned along internal surface 40 at ends 34 and 36, respectively, of second rod guide 24. Sealing elements 54 and 56 effect a sealing engagement between internal surface 40 of second rod guide 24 and external surface 30 of polished rod 32. An annular exterior sealing element 62 protrudes from a seal groove 64 positioned on shoulder 46 on external surface 38 of second rod guide 24. In the preferred embodiment the stop means previously referred to is in the form of protruding shoulder 66 on internal surface 18 adjacent second end 16 of housing 12. Sealing element 62 effects a sealing engagement between shoulder 46 of second rod guide 24 and shoulder 66 of housing 12.

A bearing 68 is disposed in passage 20 below annular packing elements 26. Bearing 68 is spaced from second rod guide 24 by an annular spacer 70. A bearing 72 is disposed in passage 20 above annular packing elements 26. Bearing 72 is spaced from first rod guide 22 by an annular spacer 74. Bearings 68 and 72 have sealed bearing races.

The means disposed at first end 14 of housing 12 for exerting a compressive force on annular packing elements 26, to bring annular packing elements 26 into engagement with an external surface 30 of a polished rod 32 will now be described. Housing 12 has external threads 76 and 78 at first end 14 and second end 16, respectively. External threads 78 are used to couple housing 12 to a well production string. External threads 76 are used to secure a top cap 80. First rod guide 22 has a first end which terminates in a shoulder 82, a second enlarged end 84, and an internal surface 86. Internal surface 86 defines a bore 88 extending between first end 82 and second end 84. As top cap 80 is threadedly engaged to external threads 76 on housing 12, top cap 80 exerts a compressive force upon the first end or shoulder 82 of first rod guide 22. Second end 84 of first rod guide 22, in turn, exerts a compressive force upon bearing 72, which exerts a force upon spacer 74, which exerts a force upon annular packing elements 26. Annular packing elements 26 exert a force upon spacer element 70, which exerts a force upon bearing 68, which exerts a force upon second rod guide 24, which exerts a force upon shoulder 66. Shoulder 66 on internal surface 18 of housing 12 serves as stop means which limits movement. The described elements are compressed between top cap 18 and shoulder 66. The compressive force causes annular packing elements 26 to deform until external surface 30 of polished rod 32 is engaged.

The use and operation of stuffing box 10, will now be described with reference to FIG. 1. Annular packing elements 26 are composed of asbestos, synthetic yarn, carbon, synthetic rubber or other similar material. Annular packing elements 26 are selected which have a central bore 28 which corresponds to the diameter of polished rod 32, so there is a close fit between central bore 28 and external surface 30. External threads 78 of stuffing box 10 are matingly engaged with complementary threads in an upper flow tee on a wellhead. Top cap 80 is threadedly engaged to external threads 76 on housing 12, which indirectly compresses annular packing elements 26 between top cap 18 and shoulder 66. The compressive force causes annular packing elements 26 to deform until central bore 28 engages external surface 30 of polished rod 32. Top cap 80 exerts a compressive force upon first end 82 of first rod guide 22. Second end 84 of first rod guide 22, in turn, exerts a force upon spacer 74, which exerts a force upon annular packing elements 26. Annular packing elements 26 exert a force upon spacer element 70, which exerts a force upon bearing 68, which exerts a force upon second rod guide 24, which exerts a force upon shoulder 66.

Once stuffing box 10 is assembled as illustrated in FIG. 1, and prior to tightening of cap 80 to exert a compressive force upon annular packing elements 26, lubricant is injected into stuffing box 10 through lubrication channel 53. Lubricant fills lubrication groove 48 on the external surface 38 of second rod guide 24 and then passes through the lubrication port 50 to the internal surface 40. Lubrication then fills spiral lubrication grooves 52 on the internal surface 40. Once stuffing box 10 has been completely lubricated plug 55 is inserted to close the lubrication channel 53.

In producing oil wells with rotating polished rods, there are several wear stresses on annular packing elements 26 of stuffing box 10. Rod guide members 22 and 24 are dimensioned so as to fill pasage 20 at ends 14 and 16, respectively, of housing 12, thereby minimizing any lateral play or movement of the polished rod 32 as it rotates in stuffing box 10. Bearings 68 and 72 reduce the friction between the rod guides 22 and 24 and the annular packing elements 26, the inner race of each bearing rotating with the polished rod and the outer race being stationary. The bearings 68 and 72 used have sealed bearing races to reduce the risks of contamination of the sealed ball bearing member 24. Out of an abundance of caution spacers 70 and 74 are interposed between the annular packing elements 26 and the bearings 68 and 72, respectively, to prevent any adverse effects upon the bearings 68 and 72 by the compression of annular packing elements 26 and specifically to prevent direct engagement between the packing elements 26 and the bearings 68 and 72 which would otherwise interfere with free rotation of the inner races of the bearings 68 and 72. The saturation of annular packing elements 26 has led to premature wear in the prior art. The use of the annular sealing elements plays an important role in avoiding the problems which existed in the prior art. If oil production is to reach annular packing elements 26 the flow must pass either up bore 40 of second rod guide 24 or between external surface 38 of second rod guide 24 and internal surface 18 of housing 12. The engagement between shoulder 46 of second rod guide 24 and shoulder 66 of housing 12 precludes the flow of oil between external surface 38 of second rod guide 24 and internal surface 18 of housing 12. The engagement between shoulder 46 and shoulder 66 is sealed by annular exterior sealing element 62. Polished rod 32 extends through bore 40 of second rod guide 24. For oil production to pass through bore 40, it must pass between polished rod 32 and internal surface 40 of second rod guide 24. The space between the polished rod 32 and internal surface 40 is sealed by the annular interior sealing element 56 which is a synthetic rubber coated metal wiper seal. The lubricant injected into stuffing box 10 plays a role in improving the sealing ability of annular interior sealing element 56. Oil production cannot infiltrate into an area that is already fully occupied by lubricant. The lubricant is contained within internal surface 40 of second rod guide 24 by the annular sealing element 54.

It will be apparent to one skilled in the art from the above description that the applicant has reduced packing wear through the use of bearings and sealing elements. The bearings 68 and 72 reduce friction upon the annular packing elements 26, since it is not necessary to apply as great a compressive force on the packing elements 26 as would otherwise be required when the packing elements 26 were employed without the bearings 68 and 72. The sealing elements restrict the flow of production into annular packing elements 26. Lubrication is provided to both decrease friction and serve a role in the sealing function.

It will also be apparent to one skilled in the art that while a preferred form of invention has been set forth and described herein, various modifications and changes may be made in the construction and arrangement of parts without departing from the spirit and scope of the present invention as defined by the claims.

I claim:

1. In a stuffing box adapted for use with a rotary polished rod wherein a generally tubular housing has a first end, a second end and an internal surface defining a passage extending between the first end and the second end to receive said polished rod, a first rod guide disposed in surrounding relation to said polished rod at said first end of said housing, a second rod guide disposed in surrounding relation to said polished rod at said second end of said housing, annular packing elements having a central bore aligned with said passage between said first rod guide and said second rod guide, and means disposed at said first end of said housing for exerting a compressive force on said annular packing elements thereby forcing said annular packing elements into engagement with an external surface of said polished rod, the improvement comprising:

said second rod guide being in the form of an annular bushing having a first end disposed in said second end of said housing, a second end, an external surface and an internal surface defining a bore extending between the first end and the second end;

annular interior sealing elements at opposite ends of said bushing thereby effecting a sealing engagement between said internal surface of said bushing and said external surface of said rod; and an annular exterior sealing element on said external surface of said bushing in sealing engagement between the external surface of said bushing and an internal surface of said housing.

2. The improved stuffing box according to claim 1, said external surface of said bushing having a first portion of one diameter adjacent the first end and a second portion of a reduced diameter adjacent the second end, a shoulder extending between the first portion and second portion, and stop means on said housing being engageable with said exterior sealing element, said exterior sealing element being positioned on said shoulder such that said shoulder engages said stop means in sealing engagement.

3. The improved stuffing box according to claim 1, the external surface of the bushing having at least one lubrication groove, and at least one lubrication port extending from the lubrication groove through the bushing from the external surface to the internal surface.

4. The improved stuffing box according to claim 3, the internal surface of said bushing having a spiral lubrication groove communicating with the lubrication port.

5. In a stuffing box adapted for use with a rotary polished rod wherein there is provided a generally tubular housing having a first end, a second end, and an internal surface defining a passage extending between said first end and said second end, a first rod guide disposed in said passage at said first end of said housing, a second rod guide disposed in said passage at said second end of said housing, annular packing elements having a central bore disposed in the passage of the housing between said first rod guide and said second rod guide, stop means disposed on said internal surface at said second rod end of said housing thereby to prevent withdrawal of said second rod guide from said second end of said housing, and means disposed at said first end of said housing for exerting a compressive force on said annular packing elements thereby urging said annular packing elements into engagement with an external surface of a polished rod extending through said central bore of said annular packing element, the improvement comprising:

a second rod guide in the form of an annular bushing having a first end, a second end, an external surface and an internal surface defining a bore extending between said first end and said second end, said external surface of said bushing having a first portion of one diameter adjacent said first end and a second portion of a reduced diameter adjacent said second end, and a shoulder extending between said first portion and second portion, said external surface of said bushing having at least one lubrication groove, and at least one lubrication port extending from said lubricating groove through said bushing from said external surface to said internal surface;

a first bearing member disposed in said passage between said annular packing elements and said second rod guide;

a second bearing member disposed in said passage between said annular packing elements and said first rod guide;

annular interior sealing elements at said first and second ends of said bushing thereby effecting a sealing engagement between said internal surface of the bushing and said external surface of the rod;

annular exterior sealing means positioned on said shoulder of said external surface of said bushing thereby effecting a sealing engagment between said external surface of the bushing and said stop means on said internal surface of said housing.

6. The improved stuffing box according to claim 5, said first and second bearing members each having sealed bearing races.

7. The improved stuffing box according to claim 5, said internal surface of said bushing having a spiral lubrication groove communicating with said lubrication port.

8. In a stuffing box assembly wherein a rotary polished rod is disposed for extension through a generally tubular housing, said housing provided with first and second rod guides disposed at opposite ends of said housing and annular packing elements interposed between said first and second rod guides, the improvement comprising:

first and second bearing members interposed respectively between said first rod guide and said packing elements and said second rod guide and said packing elements, each of said bearing members having an inner race rotatable with said polished rod and a stationary outer race; and sealing means associated with said second rod guide to prevent the entry of fluid between said second rod guide and said polished rod.

9. A stuffing box according to claim 8, including lubricating grooves filled with lubricant between said second rod guide and said polished rod.

10. A stuffing box according to claim 8, said first and second bearing members each being defined by ball bearings.

11. A stuffing box according to claim 8, including low-friction spacer elements between said packing elements and said first and second bearing members.

12. In a stuffing box adapted for use with a rotary polished rod wherein a generally tubular housing has a first end, a second end and an internal surface defining a passage extending between the first end and the second end to receive said polished rod, a first rod guide disposed in surrounding relation to said polished rod at said first end of said housing, a second rod guide disposed in surrounding relation to said polished rod at said second end of said housing, annular packing elements having a central bore aligned with said passage between said first rod guide and said second rod guide, and means disposed at said first end of said housing for exerting a compressive force on said annular packing elements thereby forcing said annular packing elements into engagement with an external surface of said polished rod, the improvement comprising:

said second rod guide being in the form of an annular bushing having a first end a second end, an external surface and an internal surface defining a bore extending between the first end and the second end;

at least one bearing disposed in said passage between said annular packing elements and said second rod guide;

annular interior sealing elements at opposite ends of said bushing thereby effecting a sealing engagement between said internal surface of said bushing and said external surface of said rod; and an annular exterior sealing element on said external surface of said bushing in sealing engagement between the external surface of said bushing and an internal surface of said housing.

13. The improved stuffing box according to claim 12, said bearing having sealed bearing races.

14. The improved stuffing box according to claim 12, having at least one bearing disposed in the passage between the annular packing elements and the first rod guide.

15. In a stuffing box assembly wherein a rotary polished rod is disposed for extension through a generally tubular housing, said housing provided with first and second rod guides disposed at opposite ends of said housing and annular packing elements interposed between said first and second rod guides, the improvement comprising:

at least one bearing member disposed in said passage between said annular packing elements and said second rod guide, said bearing member having an inner race rotatable with said polished rod and a stationary outer race; and sealing means associated with said second rod guide to prevent the entry of fluid between said second rod guide and said polished rod.

* * * * *